129,014

UNITED STATES PATENT OFFICE.

ALONZO FARRAR, OF LONGWOOD, MASSACHUSETTS.

IMPROVEMENT IN THE PROCESSES OF REFINING OIL FROM THE ACID RESIDUUM OF OIL-WORKS.

Specification forming part of Letters Patent No. 129,014, dated July 16, 1872.

*To all persons to whom these presents may come:*

Be it known that I, ALONZO FARRAR, of Longwood, of the county of Norfolk and State of Massachusetts, have made a new and useful invention or process of treating the oil derived from the purification of sulphuric acid after having been used in refining petroleum; and I do hereby declare the same to be fully described as follows:

On June 14, 1864, Letters Patent of the United States No. 43,157 were granted to myself and Robert G. Loftus for a process of removing the sulphuric acid used in refining petroleum. In treating the said acid by the said patented process an oily residuum results, which has a very offensive odor.

My present invention has for its object the purification of the said oily residuum, and enables it to be effected in a cheaper way and with better results than any heretofore patented by me.

In carrying out the new process constituting the said invention, I take a quantity of the oily residuum and put it into a kettle or boiler, and by steam or heat introduced by means of a coil or applied to the outer surface of the boiler I heat the liquid or oily residuum to a temperature of 150° to 174° Fahrenheit. Next, by means of a rose or pipe or other suitable device or apparatus, I discharge either steam or air into and through the oily liquid, causing it to be thoroughly permeated by the steam or air, and this is to be continued for ten or twelve hours. Next, in order that the water of the liquid may be caused to separate from the oily portion and subside below such, the kettle or its contents is to be again heated up to 150° to 175° Fahrenheit. After the water may have duly separated from the oil the said water should be drawn therefrom or the oil be removed from it.

This process deodorizes the oil and improves or renders it fit for being used, by painters and in other ways, to advantage in the arts.

I claim as my invention—

The said process, substantially as described, in purifying the oily residuum hereinbefore mentioned.

ALONZO FARRAR.

Witnesses:
  R. H. EDDY,
  S. N. PIPER.